US008838615B2

(12) United States Patent
Shodhan et al.

(10) Patent No.: US 8,838,615 B2
(45) Date of Patent: Sep. 16, 2014

(54) COMPUTER IMPLEMENTED METHOD FOR AUTOMATICALLY MANAGING STORED CHECKPOINT DATA

(75) Inventors: Neeraj Shodhan, Belmont, CA (US); Qinqin Wang, Nashua, NH (US); Lik Wong, Union City, CA (US); Joydip Kundu, Derry, NH (US)

(73) Assignee: Oracle International Corporation, Redwood Shores, CA (US)

( * ) Notice: Subject to any disclaimer, the term of this patent is extended or adjusted under 35 U.S.C. 154(b) by 1488 days.

(21) Appl. No.: 11/347,081

(22) Filed: Feb. 2, 2006

(65) Prior Publication Data

US 2007/0192384 A1 Aug. 16, 2007

(51) Int. Cl.
*G06F 17/30* (2006.01)
(52) U.S. Cl.
CPC ................................ *G06F 17/30368* (2013.01)
USPC ........................................... 707/749; 707/755
(58) Field of Classification Search
CPC ................................................ G06F 17/30368
USPC ................ 707/202, 1, 10, 649, 655
See application file for complete search history.

(56) References Cited

U.S. PATENT DOCUMENTS

| | | | | |
|---|---|---|---|---|
| 3,674,009 A | * | 7/1972 | Williamson | 600/433 |
| 5,455,929 A | * | 10/1995 | Bosshart et al. | 703/15 |
| 7,058,664 B1 | * | 6/2006 | Hsu | 707/200 |
| 2004/0267877 A1 | * | 12/2004 | Shapiro et al. | 709/202 |
| 2005/0144197 A1 | * | 6/2005 | Kan et al. | 707/202 |
| 2005/0262097 A1 | * | 11/2005 | Sim-Tang et al. | 707/10 |
| 2006/0053088 A1 | * | 3/2006 | Ali et al. | 707/1 |
| 2007/0005665 A1 | * | 1/2007 | Vaitzblit et al. | 707/202 |
| 2007/0168698 A1 | * | 7/2007 | Coulson et al. | 714/5 |

OTHER PUBLICATIONS

Article, Utopia on the sidewalk, P. D. Smith, Jun. 16, 2008, pp. 1-9.*
Book, Great physicists: the life and times of leading physicists from Galileo to Hawking, William Cropper, p. 386.*

* cited by examiner

*Primary Examiner* — Shahid Alam
(74) *Attorney, Agent, or Firm* — Kilpatrick Townsend & Stockton LLP (57) ABSTRACT

Computer-implemented methods and computer systems for automatically managing stored checkpoint data are described. The method includes accessing a first user defined time period. The first user defined time period is related to a plurality of stored checkpoint data, and each checkpoint data of the plurality of stored checkpoint data has an associated storage time. Further, the method includes identifying a first set of checkpoint data having storage times that are within the first user defined time period. Moreover, the method includes identifying a second set of checkpoint data having storage times that are older than the first user defined time period. In addition, the method includes pruning the second set of checkpoint data according to a user specified process in proportion to storage time of each checkpoint data of the second set of checkpoint data. The older stored checkpoint data is more heavily pruned over recent stored checkpoint data.

22 Claims, 6 Drawing Sheets

COMPUTER IMPLEMENTED METHOD FOR AUTOMATICALLY MANAGING STORED CHECKPOINT DATA

FIELD OF THE INVENTION

Embodiments of the present invention generally relate to database systems, and more particularly, to a computer implemented method and system for managing checkpoints.

RELATED US APPLICATION

The U.S. patent application Ser. No. 10/414,591, filed Apr. 16, 2003, entitled "TECHNIQUES FOR INCREASING THE USEFULNESS OF TRANSACTION LOGS," by Joydip Kundu, Qinqin Wang, and Goutam Kulkarni, assigned to the same assignee of the present Patent Application, is hereby incorporated by reference.

BACKGROUND OF THE INVENTION

Nowadays, businesses, governments, and large organizations generally are very dependent on their database systems. If the database system fails, the organization may not be able to operate. Because organizations depend so heavily on their database systems, the database systems must be reliable. One way in which reliability is achieved in database system is careful design to reduce hardware and software failures; another is redundancy of hardware and data so that hardware and software failures do not result in loss of data or of service; still another is recoverability, so that when a failure does occur, the database can be restarted without loss of data.

A technique that is commonly used to achieve recoverability is logging, e.g., whenever the database system performs a transaction, it logs the results of the operations making up the transaction in a file. The result of the logging operation is a transaction log that records operations belonging to a stream of transactions performed by the database system. When a failure occurs, the transactions in the stream that were performed up to the point of the failure can be recovered by redoing the operations specified in the log file. For this reason, such transaction logs are often termed "redo logs."

The mining of redo logs can be utilized in a variety of ways. For instance, a mined redo log can be utilized for replication, auditing, asynchronous event deliveries, asynchronous change data capture, and database restoration. With respect to database restoration, to limit the amount of a redo log that must be read to redo changes, redo logs utilize checkpoints. The checkpoints are recorded outside the redo logs and each checkpoint corresponds to a specific position in the redo log. A checkpoint represents a point in the transaction stream and provides access to data that permits a redo log to be read beginning at the checkpoint that extends the redo log containing the checkpoint. From the checkpoint on, the contents of the extending redo log are exactly equivalent to what the contents of the original redo log would have been following the checkpoint. Thus, to restore a database system from the redo log after a failure, one need not begin the restoration at the beginning of the redo log, but may instead begin at the first checkpoint preceding the failure and make an extending redo log by restoring the checkpoint's data and making the extending redo log from the checkpoint.

A simple way of making a checkpoint is to save data at the checkpoint which represents the current state of all transactions that are active, e.g., uncommitted, when the checkpoint is made. In a system that handles a large number of transactions, making such a checkpoint is expensive both as regards to the time required to make the checkpoint and as regards to the checkpoint's size. Over time, checkpoint management becomes more difficult as the checkpoints grow in number and consume an increasing amount of memory. Conventionally, an approach to counteract the memory requirements of the increasing number of checkpoints is to manually remove certain checkpoints from memory. However, manual removal is time consuming, prone to human error, and may lead to removal of useful information that may negatively affect database system restoration.

SUMMARY

Computer-implemented methods and computer systems for automatically managing stored checkpoint data are described. In one embodiment, a computer-implemented method for automatically managing stored checkpoint data is disclosed. The method includes accessing a first user defined time period. The first user defined time period is related to an age of a plurality of stored checkpoint data, and each checkpoint data of the plurality of stored checkpoint data having an associated storage time that indicates the age of each stored checkpoint data. Further, the method includes identifying a first set of checkpoint data having storage times that are aged within the first user defined time period. Moreover, the method includes identifying a second set of checkpoint data having storage times that are older than the first user defined time period. In addition, the method includes pruning the second set of checkpoint data according to a user specified process in proportion to storage time of each checkpoint data of the second set of checkpoint data. Thus, the older stored checkpoint data is more heavily pruned over recent stored checkpoint data, resulting in a relatively lower checkpoint data density for older stored checkpoint data. The first set is not pruned.

In another embodiment, a computer system for automatically managing stored checkpoint data is disclosed. The computer system includes a processor. Also, the computer system includes a bus coupled to the processor. Moreover, the computer system includes a memory coupled to the bus for storing instructions that when executed by the processor implements a method of managing stored checkpoint data.

The method includes accessing a first user defined time period or age. The first user defined time period is related to a plurality of stored checkpoint data, and each checkpoint data of the plurality of stored checkpoint data having an associated storage time. Further, the method includes identifying a first set of checkpoint data having storage times that are aged within the first user defined time period. Moreover, the method includes identifying a second set of checkpoint data having storage times that are older than the first user defined time period. In addition, the method includes pruning the second set of checkpoint data according to a user specified process in proportion to storage time of each checkpoint data of the second set of checkpoint data. The older stored checkpoint data is more heavily pruned over recent stored checkpoint data. The first set is not pruned.

In addition, embodiments are also directed to a computer readable media implemented with methods as disclosed above.

These and other features, aspects and advantages of the present invention will become better understood after having read the following detailed description that is illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE DRAWINGS

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, steps, logic blocks, processing, and other symbolic representations of operations on data bits that can be performed in computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, thought not necessarily, these quantities take the form of electrical or magnetic signals capable of being stored, transferred, combined, compared, and otherwise manipulated in a computer system or similar electronic computing device. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "selecting" or "determining" or "accessing" or "identifying" or "pruning" or "comparing" or "counting" or "deciding" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Traditionally, a user performs checkpoint data management manually. However, manual checkpoint data management has several disadvantages. For example, if a user removes checkpoint data too aggressively, proper recovery of a database management system (DBMS) may be affected. Also, if a user removes too few checkpoint data, not enough memory is freed up to allow storage of new checkpoint data. Moreover, because consecutive checkpoint data may be needed for proper recovery of a DBMS, if a user removes checkpoint data randomly, improper recovery of a DBMS may result. Still, another option is for a user to purge all checkpoint data that is older than N number of days old. However, this approach may not be feasible for a user that desires the capability of restarting a DBMS session from more than N days old without providing additional storage for checkpoint data. Further, although the previous example was described in reference to using checkpoint data for the proper recovery of a database management system (DBMS), embodiments are not limited to recovery of DBMS. For example, the mining of redo logs is applicable to replication, auditing, asynchronous event deliveries, and asynchronous change data capture.

Contrary to traditional approaches, embodiments of the present invention facilitate efficient ways to automatically manage stored checkpoint data. In one embodiment, a user provides a first user defined time period, e.g., N days, related to a plurality of stored checkpoint data is accessed. Also, each checkpoint data of the plurality of stored checkpoint data has an associated storage time. Moreover, a first set of checkpoint data having storage times that are within the first user-defined time period is identified. Further, a second set of checkpoint data having storage times that are older than the first user defined time period is automatically identified. Additionally, the second set of checkpoint data is pruned according to a user specified process in proportion to storage time of each checkpoint data of the second set of checkpoint data. The older stored checkpoint data is more heavily pruned over recent stored checkpoint data. The first set is not pruned.

Thus, the present invention allows a user to extend the timeframe from which a system recovery can occur. The present invention frees up memory by reducing the number of older checkpoint data without purging all checkpoint data that is older than N number of days old. By making older checkpoint data more sparse than recent checkpoint data, a user benefits from being able to recover rapidly from a recent checkpoint data and being able to recover from a relatively old checkpoint data older than N number of days old. In one embodiment, no pruning is done for checkpoint data that is younger than N days old.

Figure 1:
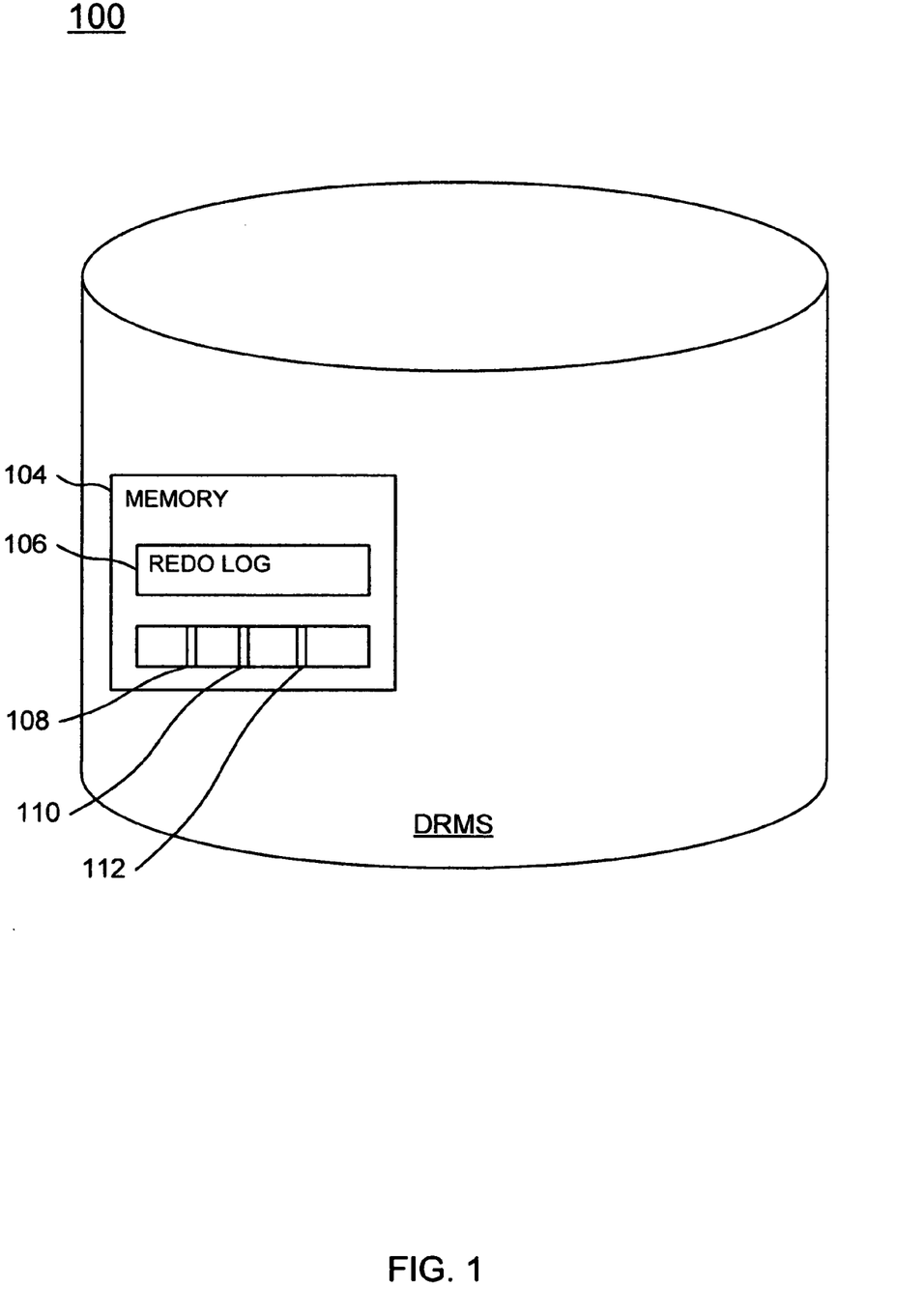
FIG. 1 is a block diagram of an exemplary database management system (DBMS) upon which embodiments of the present invention can be implemented.

FIG. 1 is a block diagram of an exemplary database management system (DBMS) 100 upon which embodiments of the present invention can be implemented. Although DBMS 100 is shown and described as having certain numbers and types of elements, the present invention is not so limited; that is, DBMS 100 may include elements other than those shown, and may include more than one of the elements that are shown.

Components of the DBMS 100 include memory 104 for storing information, redo log 106 for logging the results of operations performed on DBMS 100, and checkpoint data 108, 110, and 112 for providing access to data at that point. In the present embodiment, redo log 106 is included in memory 104. Also, memory 104 includes checkpoint data 108, 110, and 112 saved at various times, checkpoint data is described in more detail in U.S. patent application Ser. No. 10/414,591 filed on Apr. 16, 2003, which is hereby incorporated by reference.

Memory 104 can be implemented in a variety of ways. Memory 104 can be a Static Random Access Memory (SRAM), a Dynamic Random Access Memory (DRAM), or other types of volatile memory. Also, memory 104 can be a magnetic disk, a magnetic tape, a Magnetic Random Access Memory (MRAM), a storage device built using materials that can be magnetized easily in only one direction (e.g. gadolinium gallium garnet), or other storage devices that preserve the storage devices' content when the storage devices' power is off.

Further, although in the present embodiment, redo log 106 is shown to be included within DBMS 100, the present invention is not so limited. Redo log 106 may be included within other systems that operate off different application programs. For example, redo log 106 may be included as part of an operating system, a file system, or other application programs that utilize checkpoint data for recovery.

Moreover, DBMS may include greater number of memory than the one memory (memory 104) shown. Also, memory 104 may include greater number of redo logs than the one redo log (redo log 106) shown. Additionally, in other embodiments, redo log 106 may be stored in different memories.

FIGS. 2A through 2D illustrate diagrams of an exemplary automatic checkpoint data management system 200 in operation, in accordance with an embodiment of the present invention. Although automatic checkpoint data management system 200 is shown and described as having certain numbers and types of elements, the present invention is not so limited; that is, automatic checkpoint data management system 200 may include elements other than those shown, and may include more than one of the elements that are shown.

Automatic checkpoint data management system 200 includes a redo log 202 for logging the results of operations performed, a first user defined time period 204, a second user defined time period 206, exemplary checkpoint data 208, 210, 212, 214, 216, 218, 220, 222, 224, 226, 228, 230, 232, 234, 236, 238, 240, 242, 244, and 246.

Figure 2A:
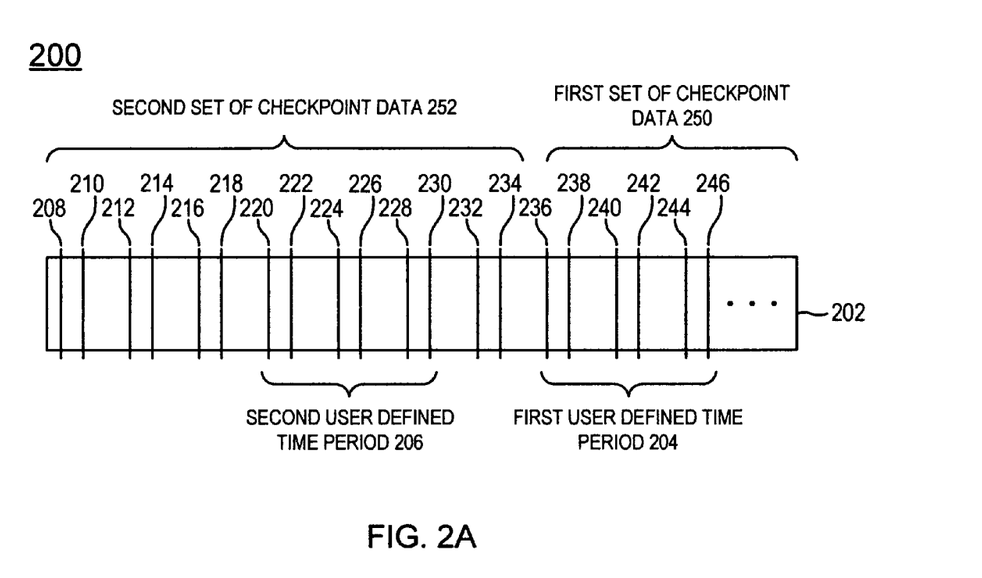
FIGS. 2A, 2B, 2C, and 2D illustrate diagrams of an exemplary system in operation, in accordance with an embodiment of the present invention.

In FIG. 2A, a first user defined time period 204 is accessed, wherein the first user defined time period 204 is related to ages of a plurality of stored checkpoint data 208, 210, 212, 214, 216, 218, 220, 222, 224, 226, 228, 230, 232, 234, 236, 238, 240, 242, 244, and 246, and wherein each checkpoint data of the plurality of stored checkpoint data has an associated storage time indicating its storage age. In one embodiment, the checkpoint data is a log-miner checkpoint data. In another embodiment, the checkpoint data is an application program checkpoint data. In other embodiments, the checkpoint data may be an operating system checkpoint data, a file system checkpoint data, or a checkpoint data for other application programs that utilize checkpoint data for recovery.

The first user defined time period 204 may be a continuous period of time without discontinuity in between as illustrated in FIG. 2A. Alternatively, the first user defined time period may be a discontinuous period of time with discontinuities in between.

Also, still referring to FIG. 2A, a first set of checkpoint data 250 having storage times that are within the first user defined time period 204 is identified. Identifying can be implemented in a variety of ways. In one embodiment, identifying is implemented by serially scanning each checkpoint data of the plurality of checkpoint data to look for checkpoint data having associated storage times within the first user defined time period 204. In another embodiment, identifying is implemented by simultaneously scanning each checkpoint data of the plurality of checkpoint data to look for checkpoint data having associated storage times within the first user defined time period 204.

Furthermore, a second set of checkpoint data 252 having storage times that are older than the first user defined time period 204 is identified. Identifying can be implemented in different ways. In one embodiment, identifying is implemented by serially scanning each checkpoint data of the plurality of checkpoint data to look for checkpoint data having associated storage times that are older than the first user defined time period. In another embodiment, identify is implemented by simultaneously scanning each checkpoint data of the plurality of checkpoint data to look for checkpoint data having associated storage times that are older than the first user defined time period 204.

Figure 2B:
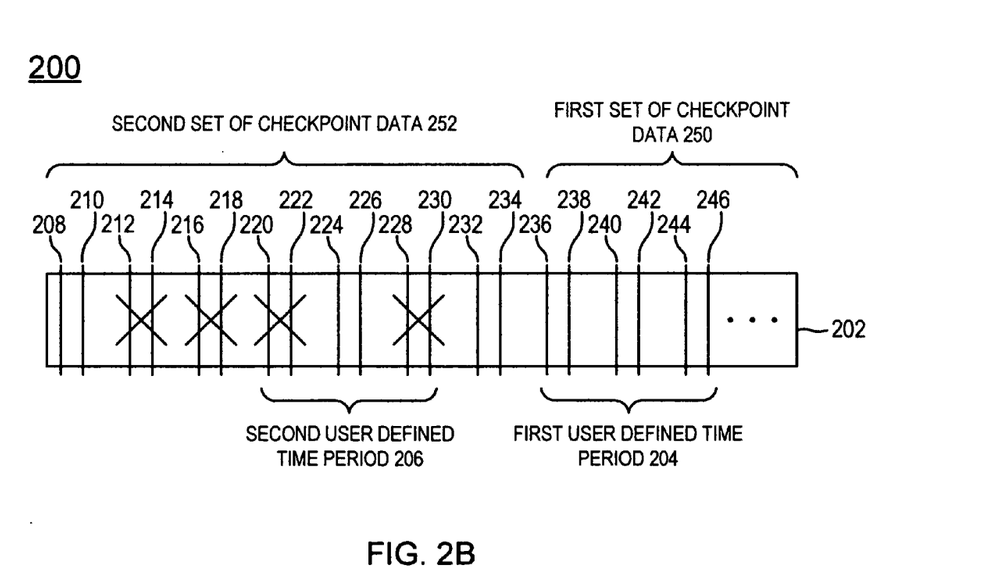

In FIG. 2B, the second set of checkpoint data 252 is automatically pruned according to a user specified process in proportion to storage time of each checkpoint data of the second set of checkpoint data, wherein older stored checkpoint data, e.g., checkpoint data 208, 210, 212, 214, 216, 218, 220, and 222, are more heavily pruned over recent stored checkpoint data, e.g., checkpoint data 224, 226, 228, 230, 232, and 234.

Further, in another embodiment, the pruning leaves unpruned groups of consecutive valid checkpoint data spaced such that database session recovery is approximately the same time from an arbitrary first group of consecutive valid checkpoint data to a subsequent group of consecutive valid checkpoint data. Moreover, in another embodiment, each of said group of consecutive valid checkpoint data of the groups of consecutive valid checkpoint data comprise of two valid consecutive checkpoint data. Also, the U.S. patent application Ser. No. 10/414,591, filed Apr. 16, 2003, entitled "TECHNIQUES FOR INCREASING THE USEFULNESS OF TRANSACTION LOGS," by Joydip Kundu, Qinqin Wang, and Goutam Kuikarni, assigned to the same assignee of the present Patent Application, is hereby incorporated by reference, which further describes functions that may be performed by a group of consecutive valid checkpoint data.

Referring still to FIG. 2B, in the present embodiment, the first set of checkpoint data is not pruned for rapid system restoration over this period. In another embodiment, the first set of checkpoint data may be pruned. Furthermore, in one embodiment, pruning of the second set of checkpoint data uses a fixed gradual time function. In addition, in another embodiment, pruning of the second set of checkpoint data uses a non-linear time function. In still another embodiment, pruning uses a user-defined function. In yet another embodiment, the pruning depends on a set of user specified parameters that determines, for example, a first user defined time period, the intensity of pruning desired, or certain specific checkpoint data to be left unpruned. Also, the set of parameters may include a parameter that specifies the intensity of pruning the second set of checkpoint data would receive. Further, the set of parameters may also include a user instruction to specifically prune certain checkpoints data.

Figure 2C:
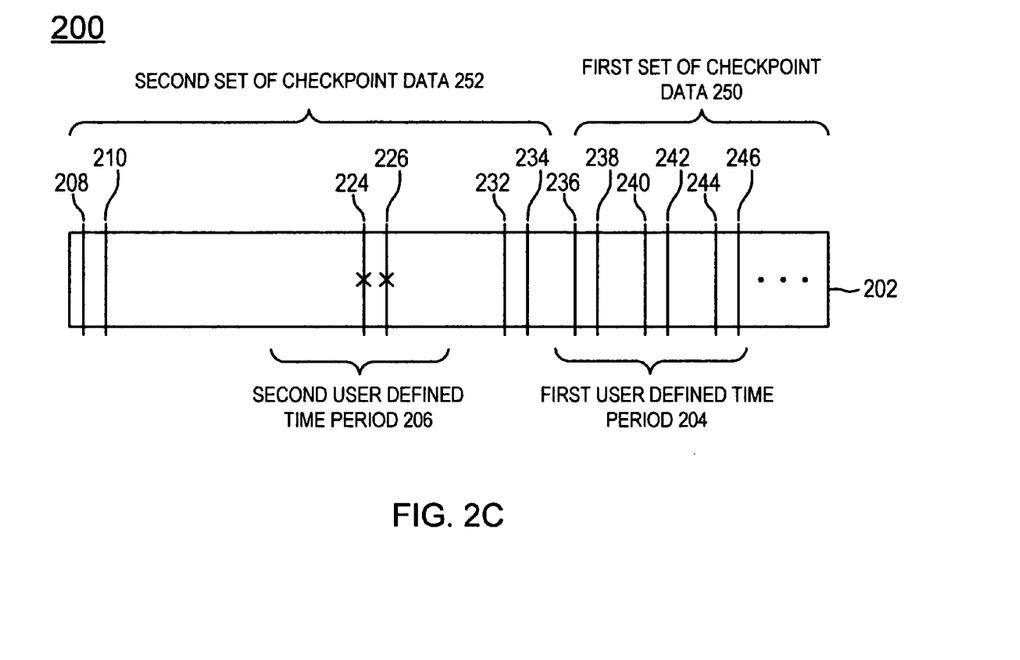
Figure 2D:
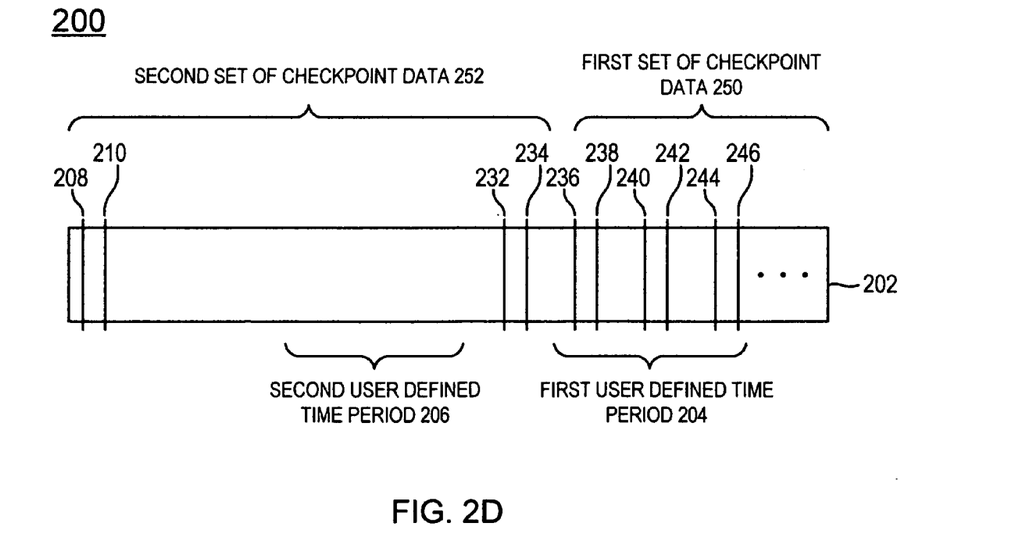

In FIG. 2C, checkpoint data having ages within a second user defined time period 206, e.g., checkpoint data 224 and 226, are removed. The second user defined time period 206 designates a finite time period prior to the first user defined time period and can be continuous as illustrated in FIG. 2D or discontinuous. Also, removal can be implemented in a variety of ways. In one embodiment, removal is implemented by physically erasing the checkpoint data from memory. In another embodiment, removal is implemented by marking and/or flagging the checkpoint data.

In FIG. 2D, the pruning leaves unpruned groups of consecutive valid checkpoint data, e.g., checkpoint data 208 and 210, checkpoint data 232 and 234, checkpoint data 236 and 238, checkpoint point data 240 and 242, and checkpoint data 244 and 246. Although in the present embodiment the groups of consecutive valid check point data includes two checkpoint data, the present invention is not so limited, that is, group of consecutive valid checkpoint data can include two or more checkpoint data.

Figure 3A:
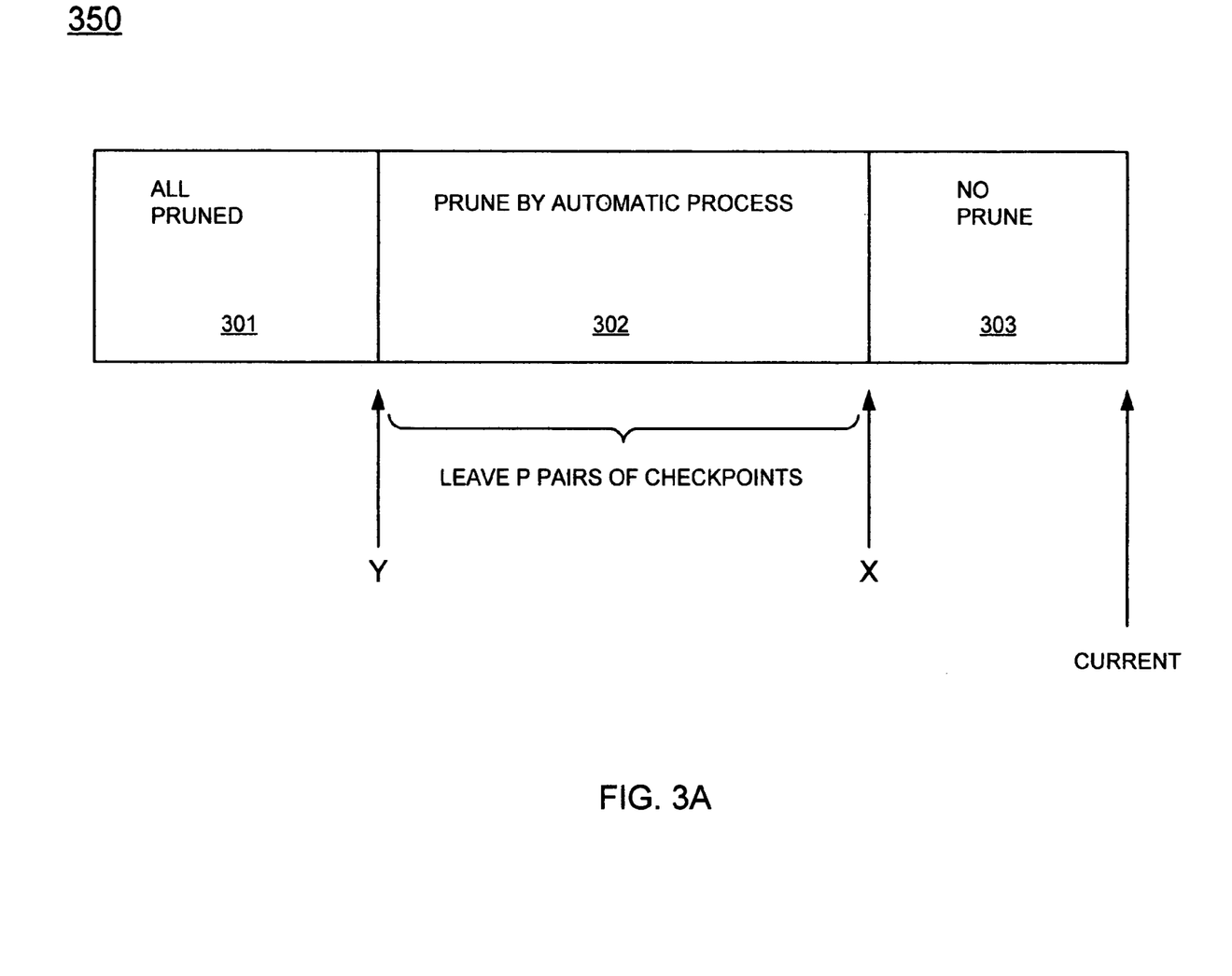
FIG. 3A is a block diagram of an exemplary redo log upon which embodiments of the present invention can be implemented.

FIG. 3A is an exemplary diagram of a redo log upon which embodiments of the present invention can be implemented. Redo log 350 comprises an all pruned section 301, prune by automatic process section 302, and a no prune section 303. The sections are defined by points X and Y. Also, although redo log 350 is shown and described as having certain numbers and types of elements, the present invention is not so limited; that is, redo log 305 may include elements other than those shown, and may include more than one of the elements that are shown. For example, redo log 350, in other embodiments, may include a greater or fewer number of sections than the three sections (301, 302, and 303) shown.

The different sections are pruned differently. The no prune section 303 defines a section where checkpoint data are not removed. In contrast, the all prune section 301 defines a section where all checkpoint data are removed. Further, the prune by automatic process section 302 defines a section where checkpoint data are selectively removed to leave P pairs of checkpoint data intact such that it takes roughly the same amount of time to recover a database session from pair 1 to pair 2, pair 2 to pair 3, et cetera. Consequently, for any given day, there would be more pairs of checkpoint data from the system's peak hours and fewer checkpoint data from the idle hours.

Figure 3B:
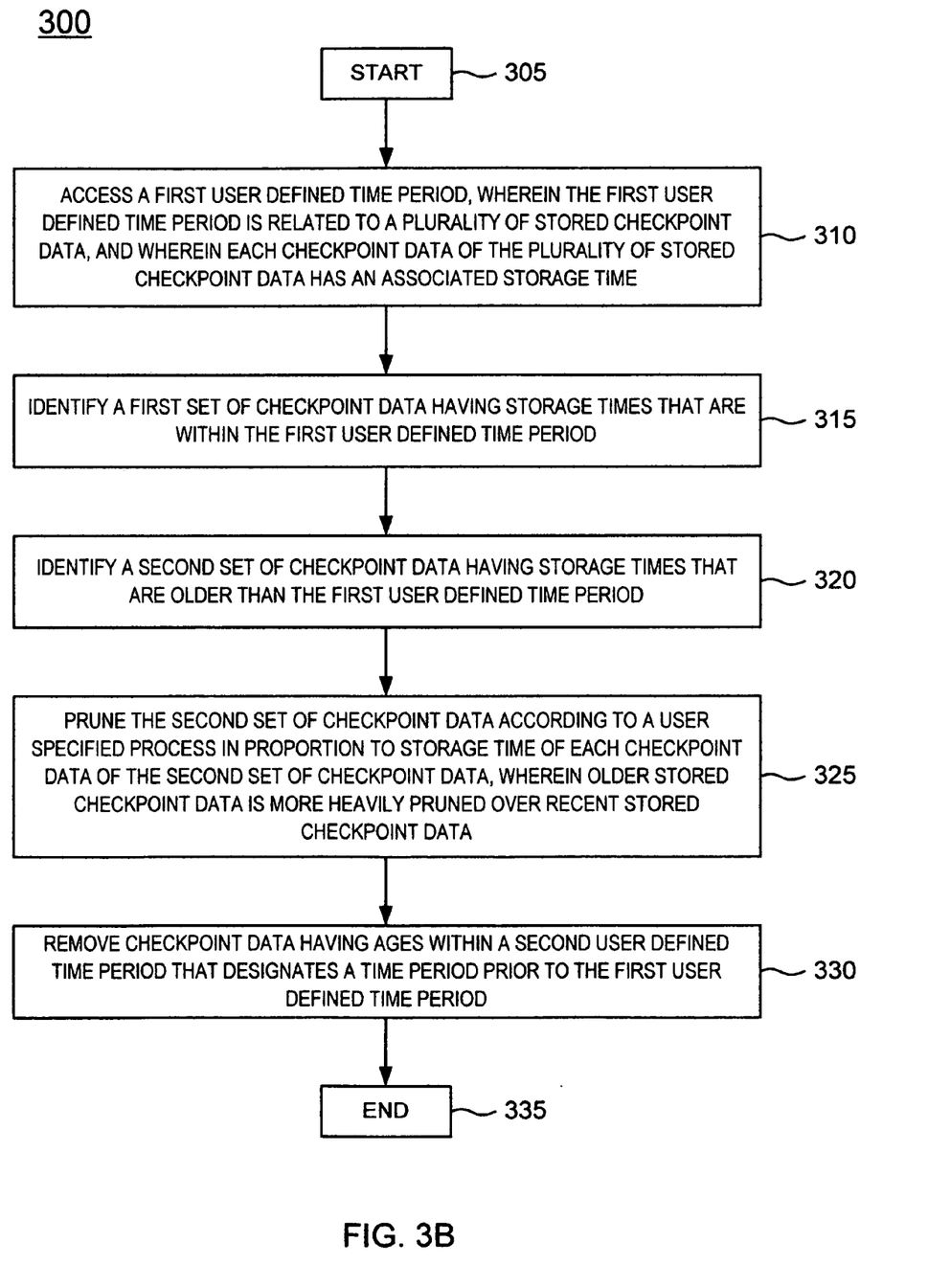
FIG. 3B is a flow chart of a computer implemented method for automatically managing stored checkpoint data upon which embodiments in accordance with the present invention may be implemented.

FIG. 3B is a flow chart 300 a computer implemented method for automatically managing stored checkpoint data upon which embodiments in accordance with the present invention may be implemented. Although specific steps are disclosed in flowchart 300, such steps are exemplary. That is, embodiments of the present invention are well suited to performing various other or additional steps or variations of the steps recited in flowchart 300. It is appreciated that the steps in flowchart 300 may be performed in an order different than presented.

At block 305, the process starts.

At block 310, in one embodiment, a first user defined time period, e.g., from X to Y, is accessed, wherein the first user defined time period is related to a plurality of stored checkpoint data, and wherein each checkpoint data of the plurality of stored checkpoint data has an associated storage time. A parameter P may also be obtained. In one embodiment, the checkpoint data is a log-miner checkpoint data. In another embodiment, the checkpoint data is an application program checkpoint data. The first user defined time period, e.g., from X to Y, may be a continuous period of time without discontinuity in between. Alternatively, the first user defined time period may be a discontinuous period of time with discontinuities in between.

At block 315, in one embodiment, a first set of checkpoint data having storage times that are younger than the first user defined time period is identified. Identifying can be implemented in a variety of ways. In one embodiment, identifying is implemented by serially scanning each checkpoint data of the plurality of checkpoint data to look for checkpoint data having associated storage times within the first user defined time period. In another embodiment, identifying is implemented by simultaneously scanning each checkpoint data of the plurality of checkpoint data to look for checkpoint data having associated storage times within the first user defined time period.

At block 320, in one embodiment, a second set of checkpoint data having storage times that are within than the first user defined time period is identified. Identifying can be implemented in a variety of ways. In one embodiment, identifying is implemented by serially scanning each checkpoint data of the plurality of checkpoint data to look for checkpoint data having associated storage times that are older than the first user defined time period. In another embodiment, identifying is implemented by simultaneously scanning each checkpoint data of the plurality of checkpoint data to look for checkpoint data having associated storage times that are older than the first user defined time period.

At block 325, in one embodiment, the second set of checkpoint data is pruned according to a user specified process in proportion to storage time of each checkpoint data of the second set of checkpoint data, wherein older stored checkpoint data is more heavily pruned over recent stored checkpoint data. In one embodiment, the pruning leaves unpruned groups of consecutive valid checkpoint data. In one embodiment, the pruning leaves P pairs of checkpoints spared so that it takes roughly the same amount of time to recover the session from pair 1 to pair 2, pair 2 to pair 3, etc. For every given day, there would be more pairs of checkpoint data from the system's peak hours and fewer checkpoint data from the idle hours.

Further, in another embodiment, the pruning leaves unpruned groups of consecutive valid checkpoint data spaced such that database session recovery is approximately the same time from an arbitrary first group of consecutive valid checkpoint data to a subsequent group of consecutive valid checkpoint data. Moreover, in another embodiment, each of said group of consecutive valid checkpoint data of the groups of consecutive valid checkpoint data comprise of two valid consecutive checkpoint data. Also, the U.S. patent application Ser. No. 10/414,591, filed Apr. 16, 2003, entitled "TECHNIQUES FOR INCREASING THE USEFULNESS OF TRANSACTION LOGS," by Joydip Kundu, Qinqin Wang, and Goutam Kulkarni, assigned to the same assignee of the present Patent Application, is hereby incorporated by reference, which further describes functions that may be performed by a group of consecutive valid checkpoint data. Additionally, in another embodiment, the first set of checkpoint data is not pruned. Furthermore, in another embodiment, the pruning uses a fixed gradual time function. In addition, in another embodiment, pruning uses a non-linear time function. In still another embodiment, pruning uses a user-defined function.

In yet another embodiment, the pruning depends on a set of parameters, and the set of parameters is specified in the user specified process. Also, the set of parameters may include a parameter that specifies how much pruning the second set of checkpoint data would receive. Further, the set of parameters may also include a user instruction to leave certain checkpoints unpruned.

At block 330, checkpoint data having ages over Y that designates a time period prior to the first user defined time period are removed. Removal can be implemented in a variety of ways. In one embodiment, removal is implemented by physically erasing the checkpoint data from memory. In another embodiment, removal is implemented by marking and/or flagging the checkpoint data. Moreover, in one embodiment, removal occurs immediately. In another embodiment, removal does not occur immediately but is time-delayed.

Further, the second user defined time period may be continuous or discontinuous. If the second user defined time period is discontinuous, it may include a plurality of separate time periods populating the time line. The discontinuity between separate time periods may be constant or arbitrary. Further, a set of user specified parameters may be used to define qualities, e.g., continuous or discontinuous, of the second user defined time period.

At block 335, the process ends.

Figure 4:
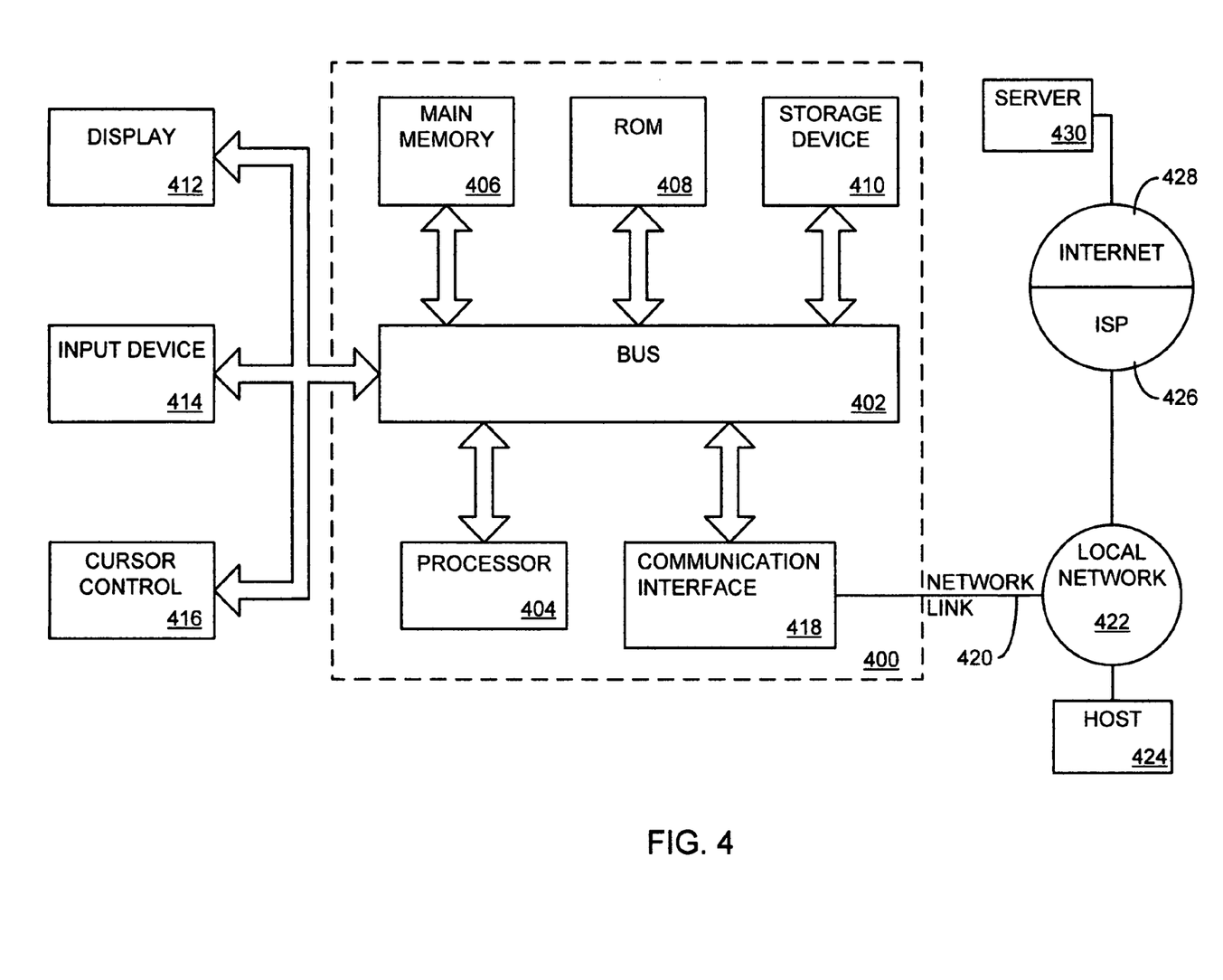
FIG. 4 is a block diagram that illustrates a computer system upon which embodiments of the invention may be implemented.

FIG. 4 is a block diagram that illustrates a computer system 400 upon which embodiments of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to an optional display 412 for displaying information to a computer user. An input device 414, including alphanumeric and other keys, may be coupled to bus 402 for communicating information and command selections to processor 404. Another type of user input device may include a cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for automatically managing stored data checkpoints. According to one embodiment of the invention, the automatic management of stored data checkpoints is provided by computer system 400 in response to processor 404 executing one or more sequences of one or more instructions contained in main memory 406. Such instructions may be read into main memory 406 from another computer readable medium, such as storage device 410. Execution of the sequences of instructions contained in main memory 406 causes processor 404 to perform the process steps described herein. One or more processors in a multi-processing arrangement may also be employed to execute the sequences of instructions contained in memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 may also include a communication interface 418 coupled to bus 402. Communication interface 418 may provide a two-way data communication coupling to a network link 420 that is connected to a local network 422. For example, communication interface 418 may be an integrated services digital network (GSDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (gSP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of carrier waves transporting the information.

Computer system 400 can send and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 1000 may obtain application code in the form of a carrier wave.

A computer-implemented method of managing stored checkpoint data and a computer system for managing stored checkpoint data are described. In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of managing stored database checkpoint data, said method comprising:
   accessing a first user defined time period, wherein said first user defined time period is related to ages of a plurality of stored database checkpoint data, and wherein each database checkpoint data of said plurality of stored database checkpoint data has an associated storage time;
   identifying a first set of database checkpoint data having storage times that are within said first user defined time period;
   identifying a second set of database checkpoint data having storage times that are older than said first user defined time period; and
   automatically pruning said second set of database checkpoint data according to a user specified process in proportion to storage time of each database checkpoint data of said second set of database checkpoint data, wherein older stored database checkpoint data is more heavily pruned over recently stored database checkpoint data.

2. The computer-implemented method as recited in claim 1, wherein said pruning leaves unpruned groups of consecutive valid database checkpoint data.

3. The computer-implemented method as recited in claim 2, wherein said groups of consecutive valid database checkpoint data are spaced such that database session recovery is approximately equal in time from an arbitrary first group of consecutive valid database checkpoint data to a subsequent second group of consecutive valid database checkpoint data.

4. The computer-implemented method as recited in claim 2, wherein each of said groups of consecutive valid database checkpoint data of said groups of consecutive valid database checkpoint data comprise of two valid consecutive database checkpoint data.

5. The computer-implemented method as recited in claim 1, wherein said first set of database checkpoint data is not pruned.

6. The computer-implemented method as recited in claim 1, wherein said database checkpoint data is a log-miner database checkpoint data, and wherein said pruning uses a fixed gradual time function.

7. The computer-implemented method as recited in claim 1 further comprising removing all database checkpoint data having ages within a second user defined time period, wherein said second user defined time period designates a time period prior to said first user defied time period.

8. A computer system comprising:
   a processor;
   a bus coupled to said processor;
   a memory coupled to said bus for storing instructions that when executed by the processor implements a method of managing stored database checkpoint data, said method comprising:
   accessing a first user defined time period, wherein said first user defined time period is related to ages of a plurality of stored database checkpoint data, and wherein each database checkpoint data of said plurality of stored database checkpoint data has an associated storage time;
   identifying a first set of database checkpoint data having storage times that are within said first user defined time period;
   identifying a second set of database checkpoint data having storage times that are older than said first user defined time period; and
   automatically pruning said second set of database checkpoint data according to a user specified process in proportion to storage time of each database checkpoint data of said second set of database checkpoint data, wherein older stored database checkpoint data is more heavily pruned over recently stored database checkpoint data.

9. The computer system as recited in claim 8, wherein said pruning leaves unpruned groups of consecutive valid database checkpoint data.

10. The computer system as recited in claim 9, wherein said groups of consecutive valid database checkpoint data are spaced such that database session recovery is approximately equal in time from an arbitrary first group of consecutive valid database checkpoint data to a subsequent second group of consecutive valid database checkpoint data.

11. The computer system as recited in claim 9, wherein each of said group of consecutive valid database checkpoint data of said groups of consecutive valid database checkpoint data comprise of two valid consecutive database checkpoint data.

12. The computer system as recited in claim 8, wherein said first set of database checkpoint data is not pruned.

13. The computer system as recited in claim 8, wherein said database checkpoint data is a log-miner database checkpoint data, and wherein said pruning uses a fixed gradual time function.

14. The computer system as recited in claim 8 further comprising removing all database checkpoint data having ages within a second user defined time period, wherein said second user defined time period designates a time period prior to said first user defined time period.

15. A non-transitory computer readable storage medium having stored therein instructions that when executed by a processor implements a method of managing stored database checkpoint data, said method comprising:
   accessing a first user defined time period, wherein said first user defined time period is related to ages of a plurality of stored database checkpoint data, and wherein each database checkpoint data of said plurality of stored database checkpoint data has an associated storage time;
   identifying a first set of database checkpoint data having storage times that are within said first user defined time period;
   identifying a second set of database checkpoint data having storage times that are older than said first user defined time period; and
   automatically pruning said second set of database checkpoint data according to a user specified process in proportion to storage time of each database checkpoint data of said second set of database checkpoint data, wherein older stored database checkpoint data is more heavily pruned over recently stored database checkpoint data.

16. The non-transitory computer readable medium as recited in claim 15, wherein said pruning leaves unpruned groups of consecutive valid database checkpoint data.

17. The non-transitory computer readable medium as recited in claim 16, wherein said groups of consecutive valid database checkpoint data are spaced such that database session recovery is approximately equal in time from an arbitrary first group of consecutive valid database checkpoint data to a subsequent second group of consecutive valid database checkpoint data.

18. The non-transitory computer readable medium as recited in claim 16, wherein each of said group of consecutive valid database checkpoint data of said groups of consecutive valid database checkpoint data comprise of two valid consecutive database checkpoint data.

19. The non-transitory computer readable medium as recited in claim 15, wherein said first set of database checkpoint data is not pruned, and wherein said database checkpoint data is a log-miner database checkpoint data.

20. The non-transitory computer readable medium as recited in claim 15 further comprising removing all database checkpoint data having ages within a second user defined time period, wherein said second user defined time period designates a time period prior to said first user defined time period.

21. The computer-implemented method of claim 1, wherein each of the plurality of stored checkpoint data corresponds to at least a portion of a redo log of a database management system.

22. The computer-implemented method of claim 1, wherein said first set of database checkpoint data corresponds to a first portion of a redo log, and said second set of database checkpoint data corresponds to a second portion of a redo log, the second portion being non-overlapping with the first portion.

* * * * *

UNITED STATES PATENT AND TRADEMARK OFFICE
CERTIFICATE OF CORRECTION

| | | |
|---|---|---|
| PATENT NO. | : 8,838,615 B2 | Page 1 of 1 |
| APPLICATION NO. | : 11/347081 | |
| DATED | : September 16, 2014 | |
| INVENTOR(S) | : Shodhan et al. | |

It is certified that error appears in the above-identified patent and that said Letters Patent is hereby corrected as shown below:

In the Specification

In column 3, line 54, delete "thought" and insert -- though --, therefor.

In column 6, line 18, delete "identify" and insert -- identifying --, therefor.

In column 6, line 43, delete "Kuikarni," and insert -- Kulkarni, --, therefor.

In column 10, line 38, delete "(GSDN)" and insert -- (ISDN) --, therefor.

In column 10, line 52, delete "(Gsp)" and insert -- (ISP) --, therefor.

In the Claims

In column 11, line 64, in Claim 7, delete "defied" and insert -- defined --, therefor.

Signed and Sealed this
Seventeenth Day of March, 2015

Michelle K. Lee
*Director of the United States Patent and Trademark Office*